Aug. 8, 1939.    J. W. WILLIAMSON    2,168,503
PHOTOGRAPHIC ENLARGEMENT DEVICE
Filed July 29, 1938    2 Sheets-Sheet 1
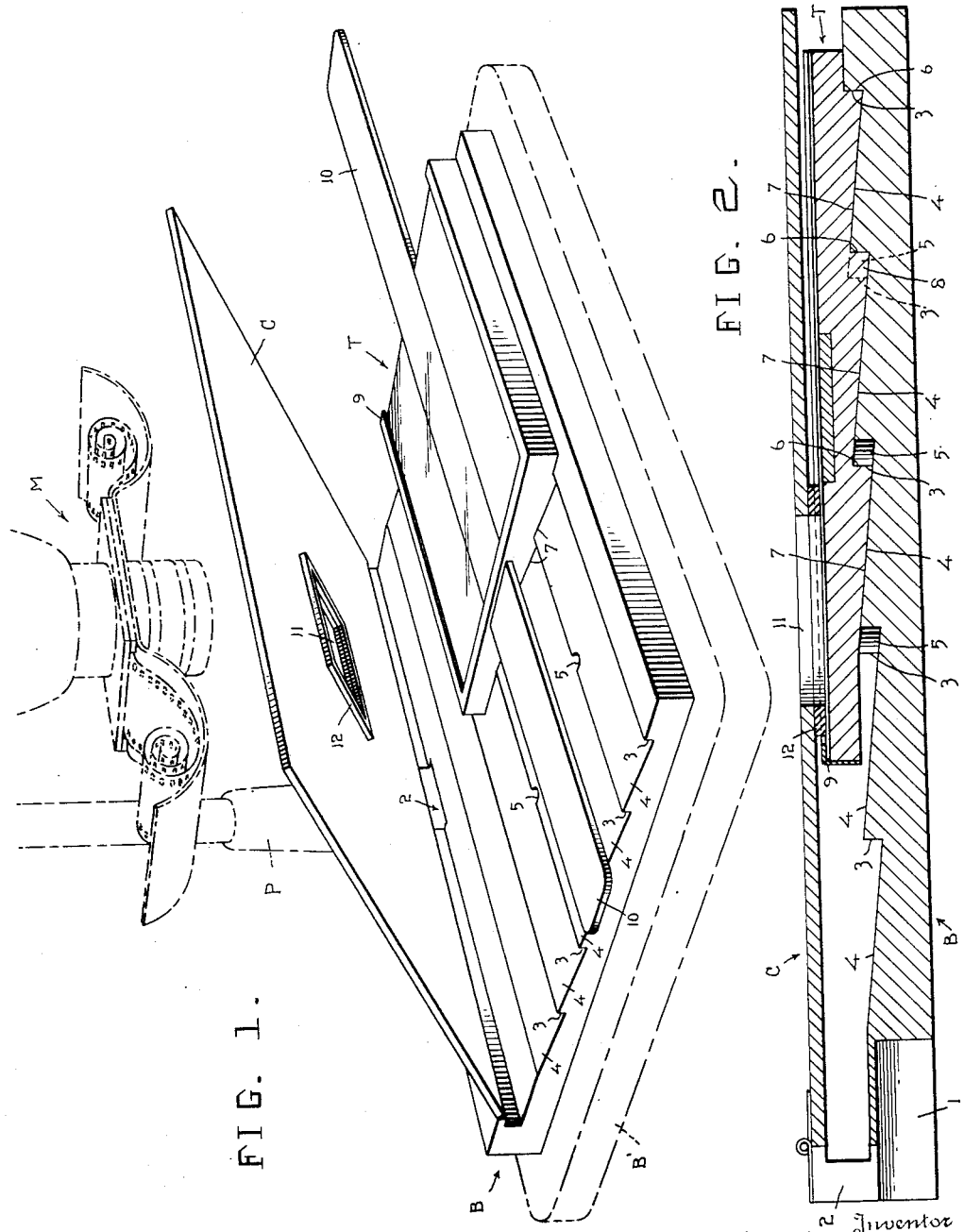
Inventor
James W. Williamson
By Ogle R. Singleton
Attorney

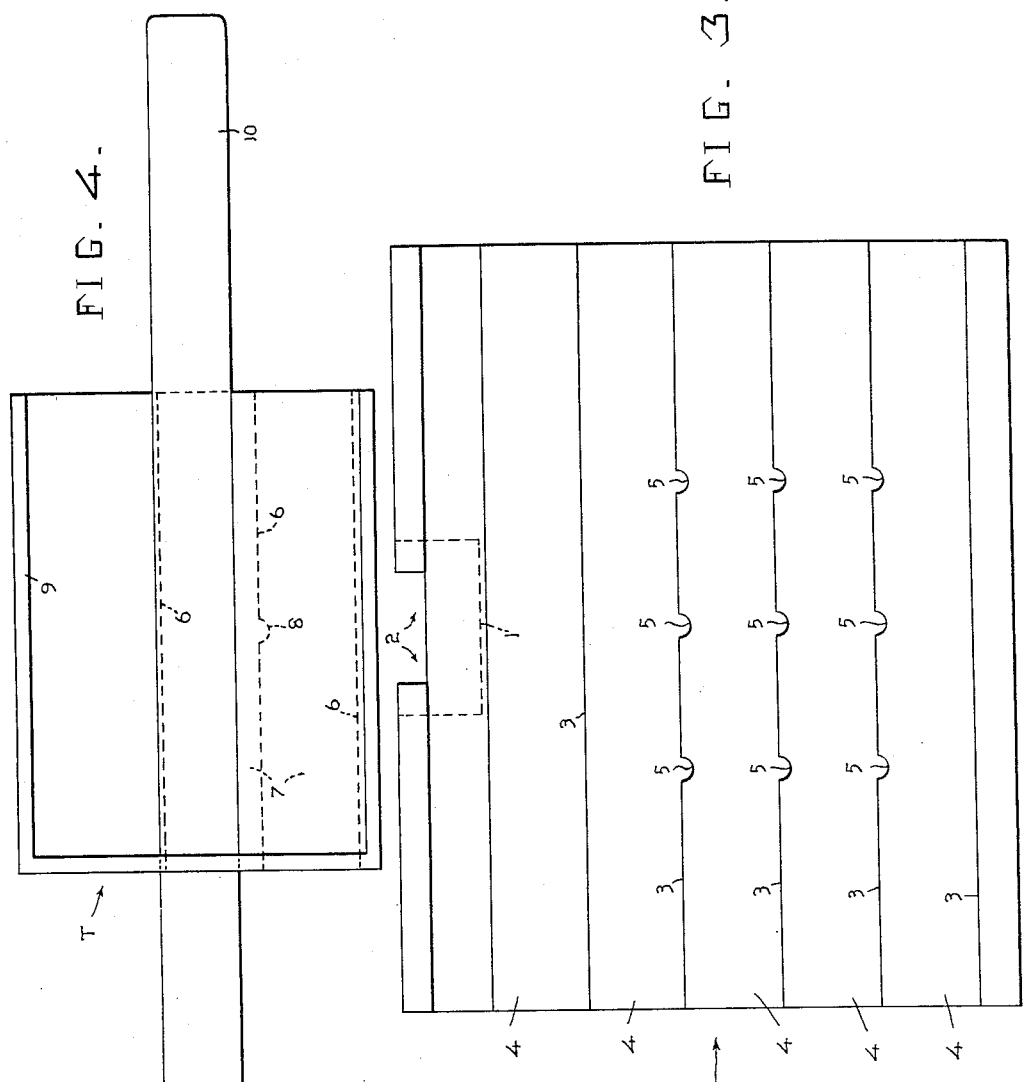

Patented Aug. 8, 1939

2,168,503

UNITED STATES PATENT OFFICE 2,168,503

PHOTOGRAPHIC ENLARGEMENT DEVICE

James W. Williamson, Greenwich, Conn.

Application July 29, 1938, Serial No. 222,043

3 Claims. (Cl. 88—24)

My invention consists in a new and useful improvement in photographic enlargement devices and is designed to provide a device by the use of which a plurality of enlarged photographic prints may be produced upon a single sheet of sensitive photographic paper. My improved device consists essentially of a movable table for the sensitive sheet, and a base for said table, provided with a hinged cover having an aperture. I provide coacting means on the table and base whereby the table may be adjusted in any one of a plurality of positions relative to said base, whereby independent areas of the sensitive sheet carried by the table may be positioned successively in relation to said aperture, so that a photographic print may be produced upon each of said areas.

While I have illustrated in the drawings filed herewith and have hereinafter fully described one specific embodiment of my invention, it is to be distinctly understood that I do not consider my invention limited to said specific embodiment, but refer for its scope to the claims appended hereto.

In the drawings:

Fig. 1 is a perspective view of my device placed upon the base of an enlarging mechanism indicated in dotted lines, the hinged cover of the device being partially raised.

Fig. 2 is a transverse vertical section of the device, the cover being closed.

Fig. 3 is a top plan view of the base portion of the device.

Fig. 4 is a top plan view of the movable table of the device.

Fig. 5 is a fragmentary perspective view of a corner of the table.

As illustrated in the drawings, my device consists of a base B and a table T. The base B is of suitable size and shape to be positioned upon the usual base B' of the enlarging mechanism M, and is provided at its rear edge with the suitable cut-out portions 1 and 2 so that it can be positioned against the pedestal P of the enlarging mechanism M, thereby properly relating my device to the enlarging mechanism M. The upper surface of the base B is formed with a series of five longitudinal vertical walls 3 and a series of five longitudinal inclined surfaces 4, each of which surfaces 4 slopes upwardly from the bottom of the wall 3 in front of the surface 4 to the top of the wall 3 at the rear of the surface 4. Suitably disposed in each of the middle three of the walls 3, there are three vertical notches 5. The lower surface of the table T is formed with a series of three longitudinal vertical walls 6 and a series of three longitudinal inclined surfaces 7, each of which surfaces 7 slopes upwardly from the bottom of the wall 6 in front of the surface 7 to the top of the wall 6 in the rear of the surface 7. Suitably disposed in the middle wall 6 there is a vertical tongue 8.

It is to be understood that the walls 3 of the base B and the walls 6 of the table T, and the inclined surfaces 4 of the base B and the inclined surfaces 7 of the table T correspond, so that when the table T is placed upon the base B, the tongue 8 may be received into any one of the notches 5.

The table T is provided with a U-shaped flange 9 about three sides of its upper edge for retaining the sensitive paper upon the table T. The table T has the laterally extended handles 10.

Suitably hinged on the rear edge of the base B is the cover C provided with the centrally disposed rectangular aperture 11 surrounded on the inner face of the cover C by a flange 12.

It is to be understood that this aperture 11 is of such a size and is so related to the enlarging mechanism M, by the proper disposition of my device, as to permit enlarged prints to be made on the sensitive paper on the table T, when the cover C has been closed upon the table T properly positioned on the base B, and that the several notches 5 are so disposed on the base B that as the tongue 8 is disposed in each notch 5, a different area of the sensitive paper is exposed through the aperture 11 for a photographic print to be made thereon.

Having described my invention, what I claim is:

1. In a photographic enlarging device, the combination of a base provided with a series of longitudinal vertical walls provided with notches, and longitudinal sloping surfaces between said walls; a cover for said base having an aperture; and a table provided with means adapted to retain a sheet of paper thereon and having a series of longitudinal vertical walls, one of which is provided with a tongue, and longitudinal sloping surfaces between said walls, the walls and surfaces on the base corresponding with the walls and surfaces, respectively, on the table, so that the tongue may be positioned in any one of said notches to maintain said table in any one of a plurality of adjusted positions on said base beneath said cover, to expose any one of a plurality of areas of said sheet through said aperture.

2. In a photographic enlargement device, the combination of a base provided with a series of longitudinal vertical walls provided with notches; a cover for said base having an aperture; and a table provided with means adapted to retain a sheet of paper thereon and having a series of longitudinal vertical walls, one of which is provided with a tongue, the walls on the base corresponding with the walls on the table, so that the tongue may be positioned in any one of said notches to maintain said table in any one of a plurality of adjusted positions on said base, to expose any one of a plurality of areas of said sheet through said aperture.

3. In a photographic enlargement device, the combination of a base provided with a series of longitudinal grooves, a series of notches being provided in a wall of each groove; a cover for said base having an aperture; and a table provided with means adapted to retain a sheet of paper thereon and having a series of serrations, one of which is provided with a tongue, said serrations corresponding with said grooves so that the tongue may be positioned in any one of said notches to maintain said table in any one of a plurality of adjusted positions on said base, to expose any one of a plurality of areas of said sheet through said aperture.

JAMES W. WILLIAMSON.